(12) United States Patent
Sanders et al.

(10) Patent No.: US 12,171,042 B2
(45) Date of Patent: **\*Dec. 17, 2024**

(54) SYSTEMS AND METHODS FOR DYNAMIC PERIODIC SERVICE REQUESTS FOR DISCONTINUOUS RECEPTION

(71) Applicant: Verizon Patent and Licensing Inc., Basking Ridge, NJ (US)

(72) Inventors: Susan Wu Sanders, Bridgewater, NJ (US); Jin Yang, Orinda, CA (US); Xin Wang, Morris Plains, NJ (US); Nischal Patel, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,827

(22) Filed: Feb. 5, 2024

(65) Prior Publication Data

US 2024/0179793 A1 May 30, 2024

Related U.S. Application Data

(63) Continuation of application No. 17/526,590, filed on Nov. 15, 2021, now Pat. No. 11,917,712.

(51) Int. Cl.
*H04W 76/28* (2018.01)
*H04W 72/542* (2023.01)

(52) U.S. Cl.
CPC ......... *H04W 76/28* (2018.02); *H04W 72/542* (2023.01)

(58) Field of Classification Search
CPC ........................... H04W 76/28; H04W 72/542
See application file for complete search history.

(56) References Cited

U.S. PATENT DOCUMENTS

2018/0146430 A1\* 5/2018 Yadav ............... H04W 52/0241

FOREIGN PATENT DOCUMENTS

| CN | 112771934 | | 5/2021 | |
|---|---|---|---|---|
| CN | 112771934 A | \* | 5/2021 | ........ H04W 52/0216 |

\* cited by examiner

*Primary Examiner* — Ayanah S George

(57) ABSTRACT

A base station may include a processor configured to configure a default time period for periodic service requests for discontinuous reception (DRX) for user equipment (UE) devices serviced by the base station. The processor may be further configured to obtain a signal quality value for a UE device serviced by the base station; determine that the obtained signal quality value is less than a low signal quality threshold; and configure a longer time period for the periodic service requests for DRX for the UE device, in response to determining that the obtained signal quality value is less than the low signal quality threshold.

20 Claims, 6 Drawing Sheets

SYSTEMS AND METHODS FOR DYNAMIC PERIODIC SERVICE REQUESTS FOR DISCONTINUOUS RECEPTION

CROSS-REFERENCE TO RELATED APPLICATIONS

This patent application is a continuation of U.S. patent application Ser. No. 17/526,590, filed on Nov. 15, 2021, and titled "SYSTEMS AND METHODS FOR DYNAMIC PERIODIC SERVICE REQUESTS FOR DISCONTINUOUS RECEPTION," the disclosure of which is hereby incorporated by reference herein in its entirety.

BACKGROUND INFORMATION

To satisfy the needs and demands of users of mobile communication devices, providers of wireless communication services continue to improve and expand available services and networks used to deliver such services. One aspect of such improvements includes the development of wireless access networks and options to utilize such wireless access networks. A wireless access network may manage a large number of devices. A wireless communication device may enter sleep mode in order to conserve battery power. Communicating with a wireless communication device in a sleep mode may present various challenges.

DETAILED DESCRIPTION OF EMBODIMENTS

Figure 1:
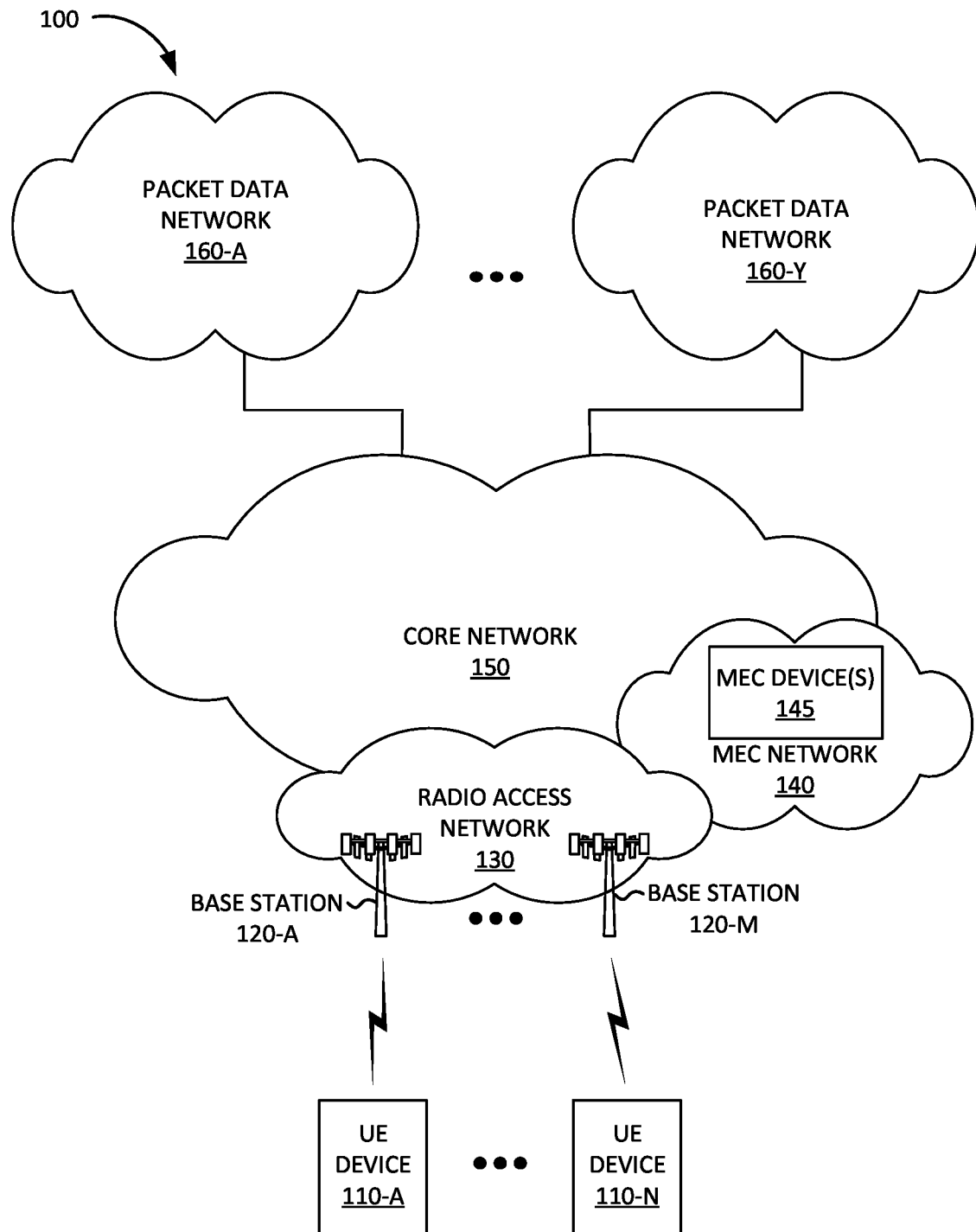
FIG. 1 illustrates an environment according to an implementation described herein.

The following detailed description refers to the accompanying drawings. The same reference numbers in different drawings identify the same or similar elements.

The number of connected Internet of Things (IOT) devices using wireless networks to communicate with each other continues to increase at a rapid pace. An IoT device may communicate with other devices without requiring explicit user interaction and may be used in a wide variety of applications. For example, IoT devices may be used in utility meters, environmental sensors, parking meters and/or occupancy sensors, security sensors, smart lighting, traffic cameras, advertising displays, point-of-sale terminals, vending machines, remote diagnostics devices, power grid sensors and/or management devices, sensors and/or actuators in manufacturing facilities, health monitoring devices, autonomous vehicles, unmanned aerial drones, and/or other types of devices.

If an IoT device is continuously awake in order to receive and decode downlink data from the network, the IoT device may consume a lot of power, which may significantly reduce battery life. Therefore, in order to conserve power, an IoT device, and/or another type of user equipment (UE) device, may enter a Discontinuous Reception (DRX) mode. In the DRX mode, a UE device enters sleep mode and wakes up at particular intervals to check whether there is any data coming from the network. If there is no data to be received from the network, the UE device returns to the sleep mode until the next wake up cycle.

However, many IoT applications may be associated with a low latency requirement, such as, for example, a road sensor used in connection with autonomous vehicles or a collision detection system, a sensor monitoring a manufacturing system, etc. The IoT device may be required to communicate with a network while satisfying the latency requirement. If a UE device is in DRX mode, the UE device may experience increased latency. The latency may be reduced through the use of periodic service requests. The UE device may be configured to wake up at particular intervals and send a service request to the network if the UE device has uplink data to send to the network. If the UE device is configured for short periodicity service requests, the UE device may experience reduced latency. However, in poor signal conditions, the short periodicity service requests are prone to failure. For example, in poor signal conditions, the service requests may fail and the UE device may not receive an uplink grant from the base station. After sending a particular number of service requests on a Physical Uplink Control Channel (PUCCH), if the UE device does not receive an uplink grant from the base station, the UE device may need to switch to sending the service requests via a Physical Random Access Channel (PRACH), which increases latency and wastes network resources. In contrast, if the UE device is configured for long periodicity service requests, the UE may be more resilient to failures in poor signal conditions, but may experience longer latency.

Implementations described herein relate to systems and methods for implementing dynamic period scheduling requests for DRX. A base station may be configured to set the time period for service requests for DRX for a UE device based on the signal quality (e.g., radio frequency (RF) conditions, etc.). The base station may configure a default time period for periodic service requests for DRX for UE devices serviced by the base station. The base station may obtain a signal quality value for a UE device serviced by the base station, determine that the obtained signal quality value is less than a low signal quality threshold and configure a longer time period for the periodic service requests for DRX for the UE device, in response to determining that the obtained signal quality value is less than the low signal quality threshold. The signal quality value may include, for example, at least one of a Reference Signal Received Power (RSRP) value, a Receive Strength Signal Indicator (RSSI) value, a Reference Signal Received Quality (RSRQ) value, a Signal to Noise Ratio (SNR) value, a Signal to Interference Plus Noise Ratio (SINR) value, and/or another type of signal quality value.

A time period may be defined based on a number of slots. Wireless communication between a UE device and a base station may be organized into frames and each frame may be divided into subframes. Each subframe may include a particular number of slots and the number of slots per subframe may be based on the numerology, defined by the subcarrier spacing and cyclic prefix overhead. Each slot may carry a particular number of Orthogonal Frequency Division Multiplexing (OFDM) symbols (e.g., 14 OFDM symbols per slot with normal cyclic prefix, 12 OFDM symbols per slot with extended cyclic prefix, etc.). As an example, a default time period based on a service request periodicity of 4 slots may result an effective periodicity of 10 slots due to the Time Division Duplex (TDD) pattern. The UE device may be configured to make 64 service request attempts on a PUCCH before switching over to making service request attempts on a PRACH. Thus, the default time period of an effective periodicity of 10 slots with 64 attempts may result in a time period of 80 milliseconds (ms). The longer time period may be based on a periodicity of 40 slots with 64 attempts, resulting in a time period of about 320 ms. Thus, the default time period may be set to less than about 100 milliseconds (ms) (e.g., 80 ms, etc.) and the longer time period may be set to more than about 300 ms (e.g., 320 ms, etc.).

The base station may be further configured to set a reconfiguration timer, in response to configuring the longer time period for the periodic service requests for DRX for the UE device, wherein a time period for the periodic service requests for DRX for the UE device is not to be changed again until the reconfiguration timer expires. At a later time, the base station may obtain another signal quality value for the UE device, determine that the other signal quality value is higher than a high signal quality threshold, and configure the periodic service requests for DRX for the UE device back to the default time period, in response to determining that the other signal quality value is higher than the high signal quality threshold.

Furthermore, in some implementations, the base station may be configured to set a default time period for periodic service requests for DRX for UE devices based on latency requirements associated with UE devices. For example, the base station may obtain a service profile for the UE device, determine that the UE device is associated with a low latency requirement based on the obtained service profile, and, in response, set the default time period for the periodic service requests for DRX for the UE device to a shorter time period than a standard default time period for UE devices that are not associated with a low latency requirement. Determining that the UE device is associated with the low latency requirement based on the obtained service profile may include determining a Class of Service (CoS) identifier associated with the UE device, determining a network slice associated with the UE device, determining an application session identifier (ID) associated with the UE device, determining a Multi-Access Edge Computing (MEC) session identifier associated with the UE device, and/or determining another type of low latency ID.

FIG. 1 is a diagram of an exemplary environment 100 in which the systems and/or methods, described herein, may be implemented. As shown in FIG. 1, environment 100 may include UE devices 110-A to 110-N (referred to herein collectively as "UE devices 110" and individually as "UE device 110"), radio access network (RAN) 130 that includes base stations 120-A to 120-X (referred to herein collectively as "base stations 120" and individually as "base station 120"), MEC network(s) 140 that include MEC device(s) 145, a core network 150, and packet data networks (PDNs) 160-A to 160-Y (referred to herein collectively as "PDNs 160" and individually as "PDN 160").

UE device 110 may include any device with cellular wireless communication functionality. UE device 110 may include an IoT device that uses machine-to-machine (M2M) communication, such as Machine Type Communication (MTC), and/or another type of M2M communication. For example, UE device 110 may include a sensor device (e.g., a vehicle proximity sensor, a motion detector, a temperature sensor, a light sensor, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), a health monitoring device (e.g., a blood pressure monitoring device, a blood glucose monitoring device, etc.), and/or another type of electronic device.

In other implementations, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

Base station 120 may include a Fifth Generation (5G) New Radio (NR) base station (e.g., a gNodeB) and/or a Fourth Generation (4G) Long Term Evolution (LTE) base station (e.g., an eNodeB). Each base station 120 may include devices and/or components configured to enable cellular wireless communication with UE devices 110. For example, base station 120 may include a radio frequency (RF) transceiver configured to communicate with UE devices using a 5G NR air interface, a 4G LTE air interface, and/or using another type of cellular air interface. Base station 120 may enable communication with core network 150 to enable core network 150 to authenticate UE device 110 with a subscriber management device (e.g., Home Subscriber Server (HSS) in 4G, Unified Data Management (UDM) in 5G, etc.).

RAN 130 may enable UE devices 110 to connect to core network 150 via base stations 120 using cellular wireless signals. For example, RAN 130 may include one or more central units (CUs) and distributed units (DUs) (not shown in FIG. 1) that enable and manage connections from base stations 120 to core network 150. RAN 130 may include features associated with one or more of the following: an LTE Advanced (LTE-A) network and/or a 5G core network or other advanced network; management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (Het-Nets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IOT) technology, and/or other types of MTC technology; and/or other types of LTE-A and/or 5G functionality.

Each MEC network 140 may be associated with one or more base stations 120 and may provide MEC services for UE devices 110 attached to the base stations 120. MEC network 140 may be in proximity to the one or more base stations 120 from a geographic and network topology perspective, thus enabling low latency communication with UE devices 110 and/or base stations 120. As an example, MEC network 140 may be located on a same site as one of the one or more base stations 120. As another example, MEC network 140 may be geographically closer to the one or more base stations 120, and reachable via fewer network hops and/or fewer switches, than other base stations 120 and/or packet data networks 160. As yet another example, MEC network 140 may be reached without having to go through a gateway device, such as a 4G Packet Data Network Gateway (PGW) or a 5G User Plane Function (UPF). MEC network 140 may include one or more MEC devices 145. MEC devices 145 may provide MEC services to UE devices 110, such as, for example, content delivery of streaming audio and/or video, cloud computing services, authentication services, etc. In some implementations, MEC devices 145 may host deployed Virtual Network Functions (VNFs) used to implement network functions for core network 150.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and PDN 160. In some implementations, core network 150 may include a 5G core network. A 5G core network may include devices that implement network functions (NFs). The NFs may include a Unified Data Management (UDM) function to store and manage subscription information, handle user identification and authentication, and perform access authorization. The subscription information for UE device 110 may include latency requirements associated with UE device 110. Other NFs in a 5G core network that may provide latency requirements information to base station 120 may include: an Access and Mobility Function (AMF) that performs registration management, connection management, reachability management, mobility management, and/or lawful intercepts; a Session Management Function (SMF) that performs session management, session modification, session release, IP allocation and management, and selection and control of a User Plane Function (UPF); a UPF that serves as a gateway to packet data network 160, act as an anchor point, perform packet inspection, routing, and forwarding, perform CoS handling in the user plane, uplink traffic verification, transport level packet marking, downlink packet buffering, and/or other type of user plane functions; a Policy Control Function (PCF) that supports policies to control network behavior, provide policy rules to control plane functions, access subscription information relevant to policy decisions, and perform policy decisions; and/or another type of NF.

In other implementations, core network 150 may include a 4G LTE core network (e.g., an evolved packet core (EPC) network). An EPC network may include a Home Subscriber Server (HSS) that stores subscription information for UE devices, including subscription profiles that include authentication and access authorization information, group device memberships, subscription privileges, and/or other types of subscription information. The subscription profiles for UE device 110 may include latency requirements associated with UE device 110. Other components in a 4G core network that may provide latency requirements information to base station 120 may include: a Mobility Management Entity (MME) for control plane processing, authentication, mobility management, tracking and paging, and activating and deactivating bearers; a Serving Gateway (SGW) that provides an access point to and from UE devices, acts as a local anchor point during handovers, and directs gateway to a PGW; a PGW that functions as a gateway to a particular PDN 160; a Policy and Charging Rules Function (PCRF) that implements policy and charging rules functions, such as establishment of Quality of Service (QOS) requirements, setting allowed bandwidth and/or data throughput limits for particular bearers, and/or other policies; and/or other types of components of a 4G core network.

PDNs 160-A to 160-N may each include a packet data network. A particular PDN 160 may be associated with an Access Point Name (APN) and UE device 110 may request a connection to the particular PDN 160 using the APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
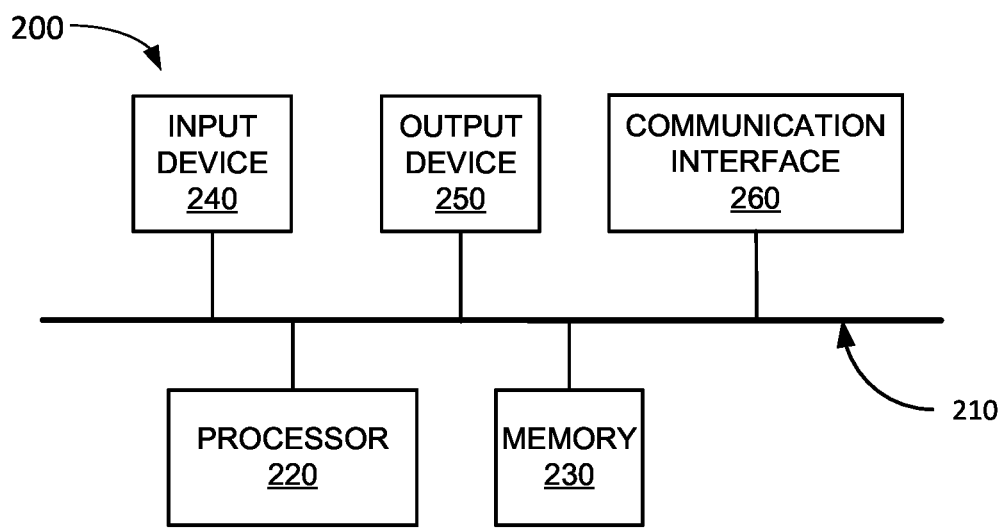
FIG. 2 is a diagram illustrating exemplary components of a device that may be included in a component of an environment according to an implementation described herein.

FIG. 2 is a diagram illustrating example components of a device 200 according to an implementation described herein. UE device 110, base station 120, and/or MEC device 145 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to, and/or reception of data from, other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to configuring periodic service requests. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
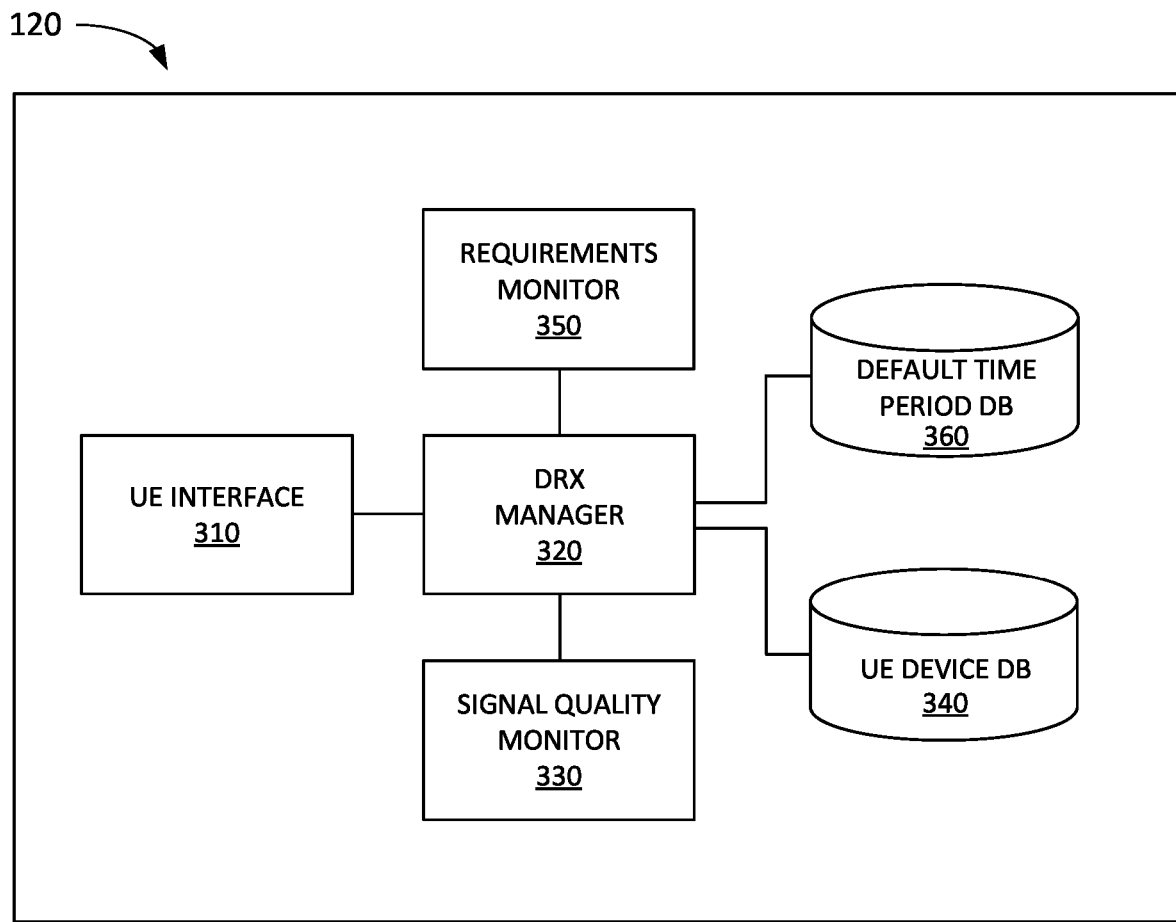
FIG. 3 is a diagram illustrating exemplary components of a base station according to an implementation described herein.

FIG. 3 is a diagram illustrating exemplary components of base station 120. The components of base station 120 may be implemented, for example, via processor 220 executing instructions from memory 230. Alternatively, some or all of the components of base station 120 may be implemented via hard-wired circuitry. As shown in FIG. 3, base station 120 may include a UE interface 310, a DRX manager 320, a signal quality monitor 330, a UE device database (DB) 340, a requirements monitor 350, and a default time period DB 360.

UE interface 310 may implement an air interface with UE devices 110. DRX manager 320 may manage a DRX configuration for UE devices 110. For example, DRX manager 320 may set a DRX configuration for UE device 110 based on the signal quality associated with UE device, based on a latency requirement associated with UE device 110, and/or based on other type of criteria. DRX manager 320 may obtain a signal quality value for UE device 110 from signal quality monitor 330.

Signal quality monitor 330 may monitor the signal quality associated with UE devices serviced by base station 120. For example, signal quality monitor 330 may receive, at particular intervals, a measurement report from UE device 110 that includes one or more signal quality values measured by UE device 110. In some implementations, signal quality monitor 330 may compute one or more additional signal quality values based on information included in a measurement report. The signal quality values monitored by signal quality monitor 330 may include RSRP values, RSSI values, RSRQ values, SNR values, SINR values, and/or other types of signal quality values.

DRX manager 320 may store the obtained signal quality value for UE device 110 in UE device DB 340 and select a time period for periodic service requests for DRX for UE device 110 based on the obtained signal quality value. UE device DB 340 may store, for a particular UE device 110 serviced by base station 120, an assigned time period for periodic service requests for DRX for the particular UE device 110 and one or more signal quality values obtained from the particular UE device 110. DRX manager 320 may store a low signal quality threshold and/or a high signal quality threshold. DRX manager 320 may increase the time period for periodic service requests for DRX for UE device 110 if the obtained signal quality value for UE device 110 is below the low signal quality threshold. DRX manager 320 may decrease the time period for periodic service requests for DRX for UE device 110 if the obtained signal quality value for UE device 110 is above the high signal quality threshold.

Each time DRX manager 320 changes the time period for periodic service requests for DRX for UE device 110, DRX manager 320 may set a reconfiguration timer so that the time period is not reconfigured too often for UE device 110 and may not change the time period for UE device 110 again until the reconfiguration timer is expired. Changing the time period too often for UE device 110 may be an inefficient use of network resources and may not improve the latency performance for UE device 110.

In some implementations, DRX manager 320 may use a time series of historical signal quality values for UE device 110 to estimate future signal quality for UE device 110. For example, DRX manager 320 may use a machine learning model, trained to estimate future signal quality values based on a set of historical signal quality values. DRX manager 320 may use the estimated future signal quality to select a time period configuration for periodic service requests for DRX for UE device 110 for a time period in the future.

Requirements monitor 350 may obtain information identifying a latency requirement associated with UE device 110. As an example, requirements monitor 350 may obtain latency requirement information for UE device 110 from a UDM or an HSS in core network 150. As another example, requirements monitor 350 may obtain the latency requirement information from another NF or component of core network 150. DRX manager 320 may use the latency requirement information for UE device 110, obtained by requirements monitor 350, to select a default time period for periodic service requests for DRX for UE device 110 based on information stored in default time period DB 360. Default time period DB 360 may store information that relates latency requirements to default time periods. As an example, default time period DB 360 may relate guaranteed latency values to default time periods. As another example, default time period DB 360 may relate particular CoS IDs, network slice IDs, application IDs, MEC session IDs, and/or other types of IDs to particular default time periods.

Although FIG. 3 shows exemplary components of base station 120, in other implementations, base station 120 may include fewer components, different components, additional components, or differently arranged components than depicted in FIG. 3. Additionally, or alternatively, one or more components of base station 120 may perform one or more tasks described as being performed by one or more other components of base station 120.

Figure 4:
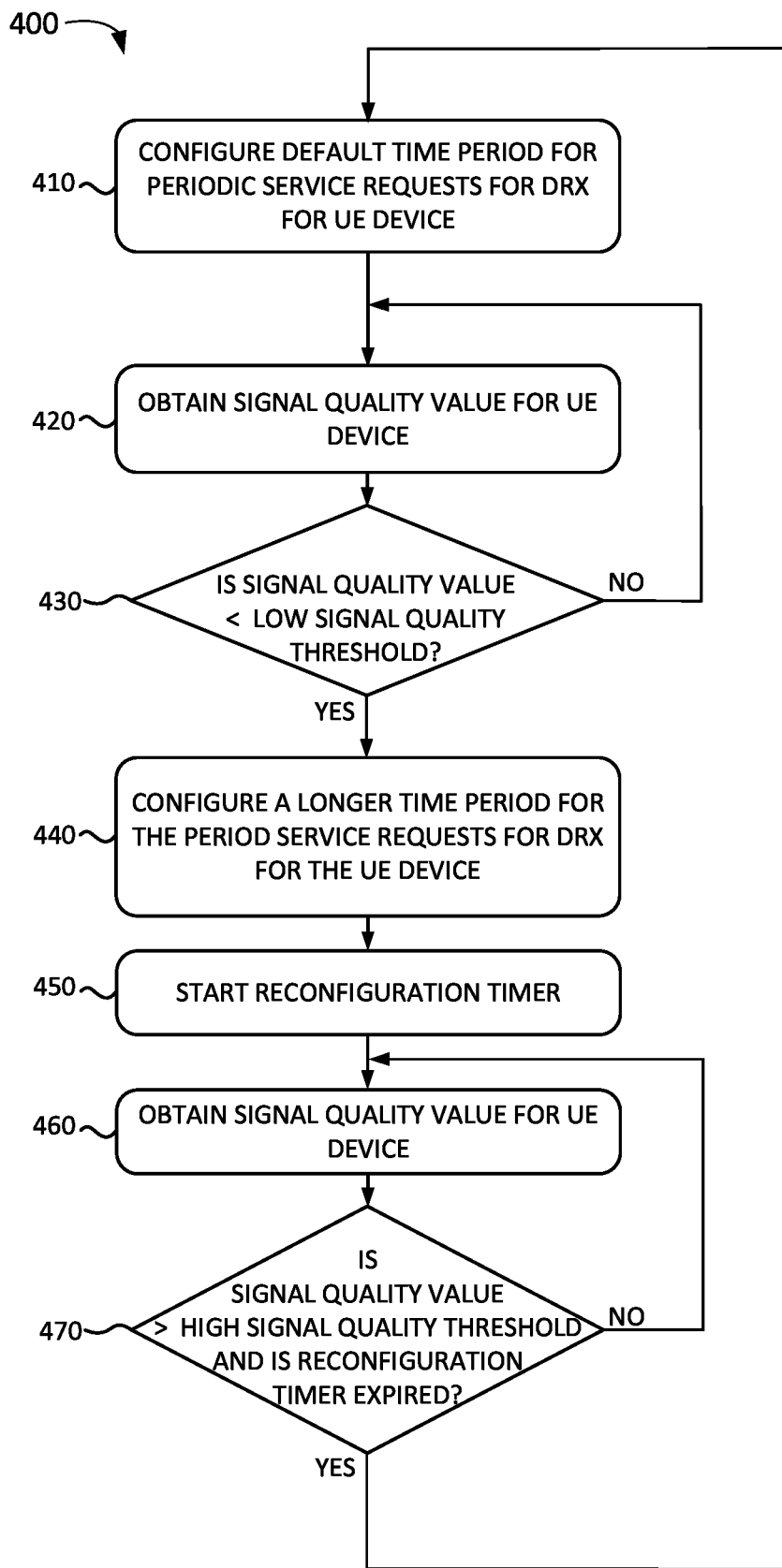
FIG. 4 illustrates a first flowchart for setting a dynamic periodic service requests according to an implementation described herein.

FIG. 4 illustrates a process 400 for setting dynamic periodic service requests according to an implementation described herein. In some implementations, process 400 of FIG. 4 may be performed by base station 120. In other implementations, some or all of process 400 may be performed by another device or a group of devices separate from base station 120.

As shown in FIG. 4, process 400 may include configuring a default time period for periodic service requests for DRX for a UE device (block 410). For example, when a new UE device 110 attaches to base station 120, base station 120 may set a default time period for periodic service requests for DRX. For example, UE device 110 may be configured to make 64 service request attempts on a PUCCH and, if the attempts are not successful, switch to making service request attempts on a PRACH. Base station 120 may set the default time period based on 4 slots, which may result in 10 slots per service request attempt, resulting in a default time period of about 80 ms.

Process 400 may further include obtaining a signal quality value for the UE device (block 420) and determining whether the obtained signal quality value is less than a low signal quality threshold (block 430). For example, base station 120 may receive a measurement report from UE device 110 that includes one or more of an RSRP value, an RSSI value, an RSRQ value, an SNR value, an SINR value, and/or another types of signal quality value and compare the received signal quality value to a low signal quality threshold. For example, a low signal quality threshold may be set to 100 decibels (dB).

If it is determined that the obtained signal quality value is not less than the low signal quality threshold (block 430—NO), processing may return to block 420 to continue to monitor the signal quality for UE device by obtaining signal quality values for the UE device at particular time intervals. If it is determined that the obtained signal quality value is less than the low signal quality threshold (block 430—YES), a longer time period for the periodic service requests for DRX for the UE device may be configured (block 440). For example, base station 120 may set the longer time period based on 40 slots per service request attempt, resulting in a time period of about 320 ms.

Process 400 may further include starting a reconfiguration timer (block 450). For example, base station 120 may set a reconfiguration timer and may not change the time period for the periodic service requests for DRX for UE device 100 until the reconfiguration timer expires, in order to prevent the time period from being changed too often. For example, in some implementations, the reconfiguration timer may be set to anywhere from about 2 seconds to 5 seconds.

Process 400 may further include obtaining a signal quality value for the UE device (block 460) and determining whether the obtained signal quality value is greater than a high signal quality threshold and whether the reconfiguration timer is expired (block 470). For example, base station 120 may receive a measurement report from UE device 110 that includes one or more of an RSRP value, an RSSI value, an RSRQ value, an SNR value, an SINR value, and/or another types of signal quality value and compare the received signal quality value to a high signal quality threshold. For example, a high signal quality threshold may be set to about 90 dB.

If it is determined that the obtained signal quality value is not greater than a high signal quality threshold or that the reconfiguration timer is not expired (block 470—NO), processing may return to block 460 to continue to monitor the signal quality for UE device by obtaining signal quality values for the UE device particular time intervals. If it is determined that the obtained signal quality value is greater than a high signal quality threshold and that the reconfiguration timer is expired (block 470—YES), processing may return to block 410 to return the UE device to the default time period for periodic service requests for DRX.

Figure 5:
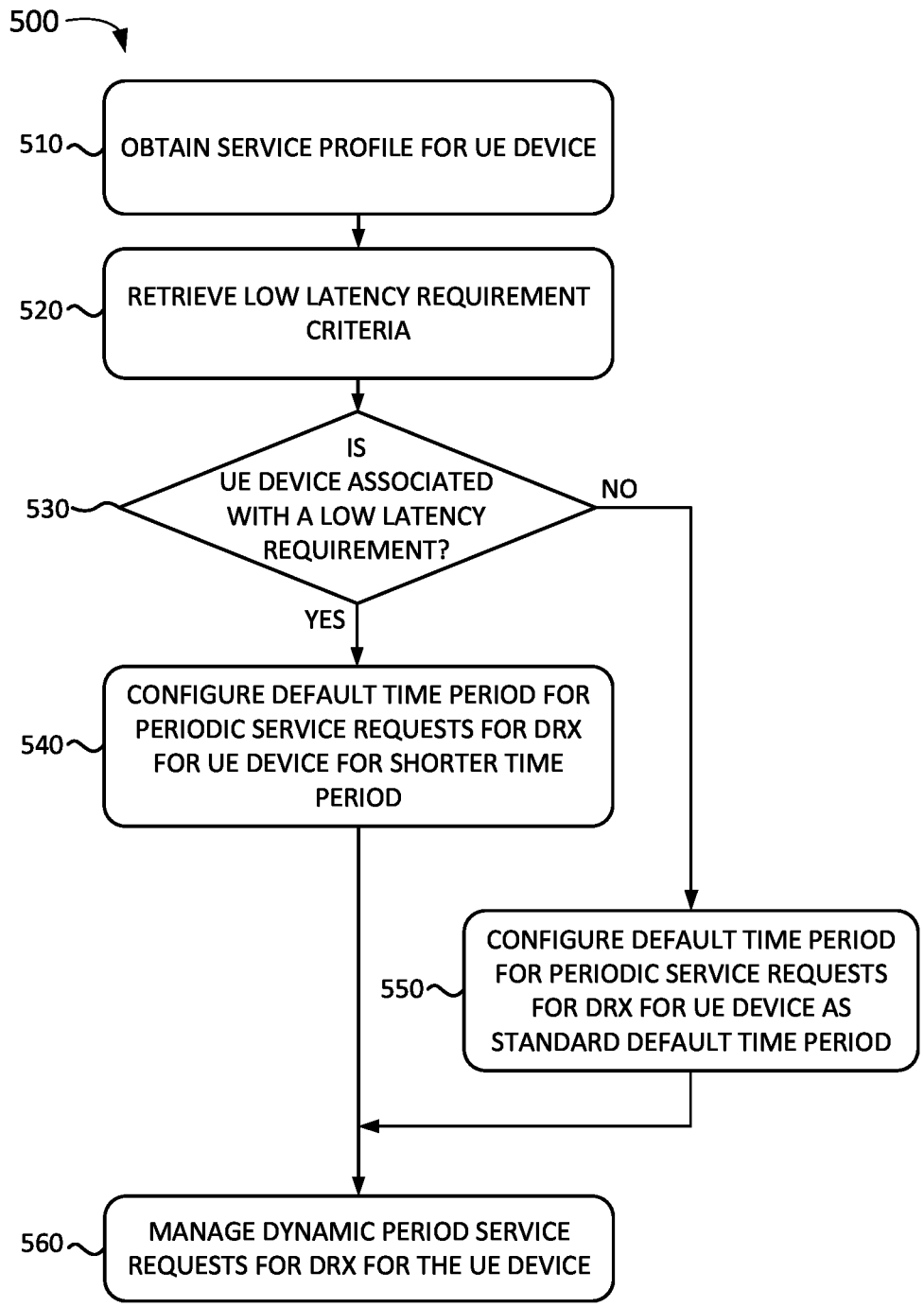
FIG. 5 illustrates a second flowchart for setting a dynamic periodic service requests according to an implementation described herein.

FIG. 5 illustrates a process 500 for setting dynamic periodic service requests according to an implementation described herein. In some implementations, process 500 of FIG. 5 may be performed by base station 120. In other implementations, some or all of process 500 may be performed by another device or a group of devices separate from base station 120.

As shown in FIG. 5, process 500 may include obtaining a service profile for a UE device (block 510), retrieving low latency requirement criteria from the service profile (block 520), and determining whether the UE device is associated with a low latency requirement (block 530). For example, base station 120 may obtain a service profile for UE device 110 from a UDM or HSS in core network 150. The service profile may include one or more latency requirements associated with UE device 110. As an example, the service profile may specify a guaranteed latency value for UE device 110. As another example, the service profile may specify a particular CoS ID, network slice ID, application ID, MEC session ID, and/or another type of ID associated with a latency requirement. Based on the obtained service profile information, base station 120 may determine whether the service profile is associated with a low latency requirement (e.g., based on information stored in default time periods DB 460).

If it is determined that the UE device is associated with a low latency requirement (block 530—YES), a default time period for periodic service requests for DRX for the UE device may be set to a shorter time period than a standard default time period (block 540). For example, base station 120 may set a shorter default time period based on 2 slots per service request attempt, resulting in a time period of about 40 ms.

If it is determined that the UE device is not associated with a low latency requirement (block 530—NO), a default time period for periodic service requests for DRX for the UE device may be set to a standard default time period (block 550). For example, base station 120 may set a standard default time period based on 4 slots per service request attempt, resulting in a time period of about 80 ms. Process 500 may further include managing dynamic periodic service requests for DRX for the UE device (block 560). For example, base station 120 may manage periodic service requests for DRX for UE device 110 as described above for process 400 of FIG. 4.

Figure 6:
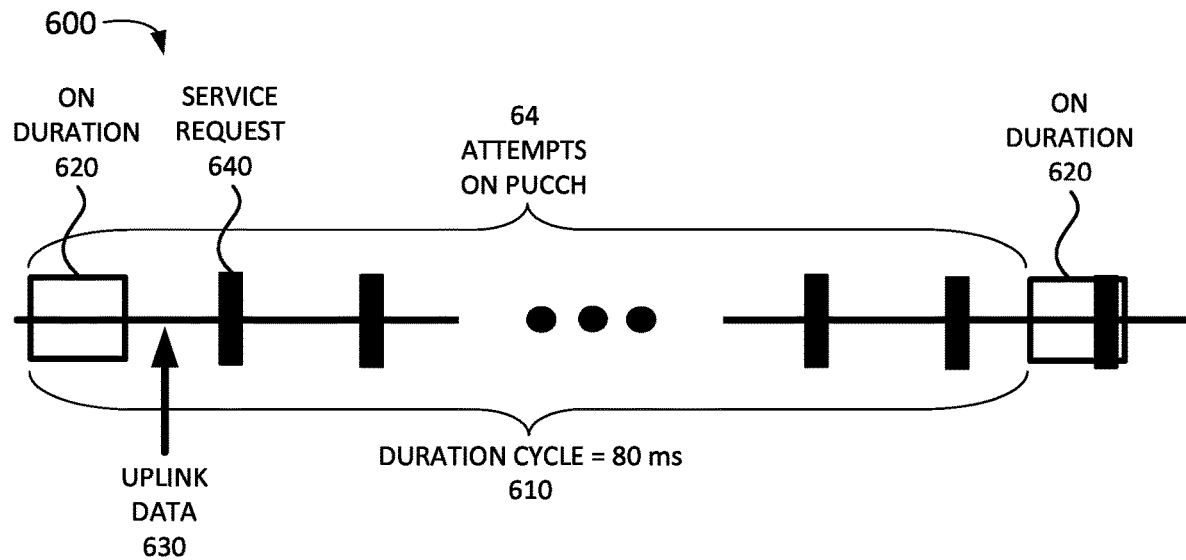
FIG. 6 is a diagram illustrating a first exemplary periodic service requests configuration according to an implementation described herein.

FIG. 6 is a diagram illustrating a first exemplary periodic service requests configuration 600 according to an implementation described herein. As shown in FIG. 6, periodic service requests configuration 600 may be based on 4 slots per service request, resulting in a duration cycle 610 of about 80 ms between on duration intervals 620, during which UE device 110 is normally in an awake state to communicate with base station 120. When uplink data 630 is received by UE device 110 while UE device 110 is not in an awake state, UE device 110 may wake up and start making service requests on a PUCCH. If the RF conditions are poor, UE device 110 may not be able to successfully contact base station 120 to receive an uplink grant from base station 120. Thus, UE device 110 may make up to 64 service request attempts on the PUCCH before switching to making service requests on a PRACH.

Figure 7:
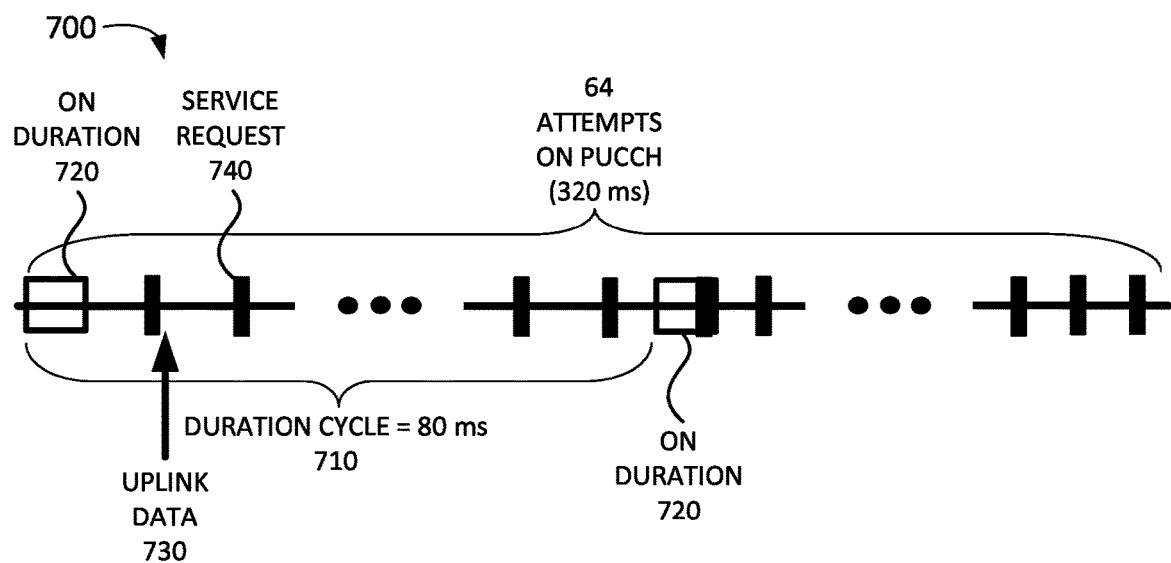
FIG. 7 is a diagram illustrating a first exemplary periodic service requests configuration according to an implementation described herein.

FIG. 7 is a diagram illustrating a first exemplary periodic service requests configuration 700 according to an implementation described herein. As shown in FIG. 7, periodic service requests configuration 700 may be based on 40 slots per service request. The DRX duration cycle 710 may be about 80 ms between on duration intervals 720, during which UE device 110 is normally in an awake state to communicate with base station 120. Thus, when uplink data 730 is received by UE device 110 while UE device 110 is not in an awake state, UE device 110 may wake up and start making service requests on a PUCCH. UE device 110 may make up to 64 service request attempts on the PUCCH before switching to making service requests on a PRACH. However, because of the configuration of 40 slots per service request, 64 service request attempts will take 320 ms. The 64 service request attempts may span through 5 DRX cycles. Thus, if the RF conditions are poor, UE device 110 may have a long time period during which to contact base station 120 in order to receive an uplink grant to send uplink data 730 to base station 120.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 4 and 5, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    configuring, by a device, a default time period for periodic service requests for discontinuous reception (DRX) for user equipment (UE) devices;
    determining, by the device, that a signal quality value for a UE device is less than a first threshold; and
    configuring, by the device, a second time period longer than the default time period for the periodic service requests for DRX for the UE device, in response to determining that the signal quality value is less than the first threshold.

2. The method of claim 1, further comprising:
    setting a reconfiguration timer, in response to configuring the second time period for the periodic service requests for DRX for the UE device, wherein a time period for the periodic service requests for DRX for the UE device is not changed again until the reconfiguration timer expires.

3. The method of claim 1, further comprising:
    obtaining another signal quality value for the UE device;
    determining that the other signal quality value is higher than a second threshold; and
    configuring the periodic service requests for DRX for the UE device to the default time period, in response to determining that the other signal quality value is higher than the second threshold.

4. The method of claim 1, further comprising:
    obtaining a service profile for the UE device;
    determining that the UE device is associated with a low latency requirement based on the obtained service profile; and
    setting the default time period for the periodic service requests for DRX for the UE device to a third time period shorter than the default time period for UE devices not associated with the low latency requirement, in response to determining that the UE device is associated with the low latency requirement.

5. The method of claim 4, wherein determining that the UE device is associated with the low latency requirement based on the obtained service profile includes at least one of:
    determining a Class of Service identifier associated with the UE device,
    determining a network slice associated with the UE device,
    determining an application session identifier associated with the UE device, or
    determining a Multi-Access Edge Computing (MEC) session identifier associated with the UE device.

6. The method of claim 1, wherein the default time period corresponds to less than about 100 milliseconds and wherein the second time period corresponds to more than about 300 milliseconds.

7. The method of claim 1, wherein the signal quality value includes at least one of:
    a Reference Signal Received Power (RSRP) value,
    a Receive Strength Signal Indicator (RSSI) value,
    a Reference Signal Received Quality (RSRQ) value,
    a Signal to Noise Ratio (SNR) value, or
    a Signal to Interference Plus Noise Ratio (SINR) value.

8. A device comprising:
    a processor configured to:
        configure a default time period for periodic service requests for discontinuous reception (DRX) for user equipment (UE) devices;
        determine that a signal quality value for a UE device is less than a first threshold; and
        configure a second time period longer than the default time period for the periodic service requests for DRX for the UE device, in response to determining that the signal quality value is less than the first threshold.

9. The device of claim 8, wherein the processor is further configured to:
    set a reconfiguration timer, in response to configuring the second time period for the periodic service requests for DRX for the UE device, wherein a time period for the periodic service requests for DRX for the UE device is not changed again until the reconfiguration timer expires.

10. The device of claim 8, wherein the processor is further configured to:
    obtain another signal quality value for the UE device;
    determine that the other signal quality value is higher than a second threshold; and
    configure the periodic service requests for DRX for the UE device to the default time period, in response to determining that the other signal quality value is higher than the second threshold.

11. The device of claim 8, wherein the processor is further configured to:
    obtain a service profile for the UE device;
    determine that the UE device is associated with a low latency requirement based on the obtained service profile; and
    set the default time period for the periodic service requests for DRX for the UE device to a third time period shorter than the default time period for UE devices not associated with the low latency requirement, in response to determining that the UE device is associated with the low latency requirement.

12. The device of claim 11, wherein, when determining that the UE device is associated with the low latency requirement based on the obtained service profile, the processor is further configured to at least one of:
    determine a Class of Service identifier associated with the UE device,
    determine a network slice associated with the UE device,
    determine an application session identifier associated with the UE device, or
    determine a Multi-Access Edge Computing (MEC) session identifier associated with the UE device.

13. The device of claim 8, wherein the default time period corresponds to less than about 100 milliseconds and wherein the longer time period corresponds to more than about 300 milliseconds.

14. The device of claim 8, wherein the signal quality value includes at least one of:
    a Reference Signal Received Power (RSRP) value,
    a Receive Strength Signal Indicator (RSSI) value,
    a Reference Signal Received Quality (RSRQ) value,
    a Signal to Noise Ratio (SNR) value, or
    a Signal to Interference Plus Noise Ratio (SINR) value.

15. A non-transitory computer-readable memory device storing instructions executable by a processor, the non-transitory computer-readable memory device comprising:
    one or more instructions to configure a default time period for periodic service requests for discontinuous reception (DRX) for user equipment (UE) devices;

one or more instructions to determine that a signal quality value for a UE device is less than a low signal quality threshold; and one or more instructions to configure a second time period longer than the default time period for the periodic service requests for DRX for the UE device, in response to determining that the signal quality value is less than the low signal quality threshold.

16. The non-transitory computer-readable memory device of claim 15, further comprising:

one or more instructions to set a reconfiguration timer, in response to configuring the second time period for the periodic service requests for DRX for the UE device, wherein a time period for the periodic service requests for DRX for the UE device is not changed again until the reconfiguration timer expires.

17. The non-transitory computer-readable memory device of claim 15, further comprising:

one or more instructions to obtain another signal quality value for the UE device;

one or more instructions to determine that the other signal quality value is higher than a high signal quality threshold; and one or more instructions to configure the periodic service requests for DRX for the UE device to the default time period, in response to determining that the other signal quality value is higher than the high signal quality threshold.

18. The non-transitory computer-readable memory device of claim 15, further comprising:

one or more instructions to obtain a service profile for the UE device;

one or more instructions to determine that the UE device is associated with a low latency requirement based on the obtained service profile; and one or more instructions to set the default time period for the periodic service requests for DRX for the UE device to a third time period shorter than the default time period for UE devices not associated with the low latency requirement, in response to determining that the UE device is associated with the low latency requirement.

19. The non-transitory computer-readable memory device of claim 15, wherein the one or more instructions to determine that the UE device is associated with the low latency requirement based on the obtained service profile further include at least one of:

one or more instructions to determine a Class of Service identifier associated with the UE device, one or more instructions to determine a network slice associated with the UE device, one or more instructions to determine an application session identifier associated with the UE device, or one or more instructions to determine a Multi-Access Edge Computing (MEC) session identifier associated with the UE device.

20. The non-transitory computer-readable memory device of claim 15, wherein the signal quality value includes at least one of:

a Reference Signal Received Power (RSRP) value,
a Receive Strength Signal Indicator (RSSI) value,
a Reference Signal Received Quality (RSRQ) value,
a Signal to Noise Ratio (SNR) value, or
a Signal to Interference Plus Noise Ratio (SINR) value.

* * * * *